United States Patent
Roguine et al.

(10) Patent No.: US 10,303,877 B2
(45) Date of Patent: May 28, 2019

(54) METHODS OF PRESERVING AND PROTECTING USER DATA FROM MODIFICATION OR LOSS DUE TO MALWARE

(71) Applicant: Acronis International GmbH, Schaffhausen (CH)

(72) Inventors: Stanislav Roguine, Candia, NH (US); Eugene Aseev, Khotkyovo (RU); Serguei Beloussov, Costa Del Sol (SG); Stanislav Protasov, Moscow (RU); Mark Shmulevich, Moscow (RU); Nikolay Grebennikov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 170 days.

(21) Appl. No.: 15/629,008

(22) Filed: Jun. 21, 2017

(65) Prior Publication Data
US 2017/0364681 A1    Dec. 21, 2017

Related U.S. Application Data

(60) Provisional application No. 62/352,597, filed on Jun. 21, 2016.

(51) Int. Cl.
*G06F 21/00*  (2013.01)
*G06F 21/56*  (2013.01)
*G06F 21/57*  (2013.01)
*G06F 21/55*  (2013.01)
*G06F 21/62*  (2013.01)

(52) U.S. Cl.
CPC .......... *G06F 21/566* (2013.01); *G06F 21/554* (2013.01); *G06F 21/564* (2013.01); *G06F 21/568* (2013.01); *G06F 21/577* (2013.01); *G06F 21/6218* (2013.01); *G06F 2221/033* (2013.01)

(58) Field of Classification Search
CPC .................................................. G06F 21/566
USPC ............................................................ 726/23
See application file for complete search history.

(56) References Cited

U.S. PATENT DOCUMENTS 7,769,731 B2 * 8/2010 O'Brien ............... G06F 21/554
  707/694
2017/0364681 A1 * 12/2017 Roguine ............... G06F 21/554

\* cited by examiner

*Primary Examiner* — Longbit Chai
(74) *Attorney, Agent, or Firm* — Arent Fox LLP; Michael Fainberg (57) ABSTRACT

Methods of preserving and protecting user data from modification or loss due to malware are disclosed, as well as systems and computer program products related to the same.

20 Claims, 9 Drawing Sheets

METHODS OF PRESERVING AND PROTECTING USER DATA FROM MODIFICATION OR LOSS DUE TO MALWARE

CROSS-REFERENCE TO RELATED APPLICATION

This patent application claims priority to U.S. Provisional Patent Application No. 62/352,597, filed on Jun. 21, 2016, which is hereby incorporated by reference in its entirety.

TECHNICAL FIELD

The disclosure is generally directed to the technical field of malware monitoring in computer devices. In particular, the disclosure concerns methods and systems for detecting, preventing and/or recovering from damage caused by a ransomware infection.

BACKGROUND

The amount of malicious software, also known as malware, is steadily growing. Moreover, malware creators are have started releasing increasingly more sophisticated types of malware, which are proving more difficult to detect and respond to than previous types. Therefore, antivirus companies are faced with new challenges to create new methods of detecting, responding to, and recovering from malware. Known methods for detection of malicious software, which were successful at detecting malware in the past, often fail to detect new types of malware. Currently, the most popular malware detection methods include: heuristic analysis, signature analysis, behavioral analysis, and hash sum analysis. The signature and hash sum techniques are well suited for detecting known malware (i.e., software that has already been investigated and for which a specimen has been entered in a database of malicious software). However, these techniques often fail to properly detect and categorize modified malware code. Heuristic analysis partially overcomes this shortcoming, but may still fail to detect obfuscated or substantially modified malware. Behavioral analysis often proves most effective in detecting modified malware, but even this method has a number of shortcomings. For example, in order to analyze the behavior of a program using this method, the program needs to be triggered first; however, malware may inflict serious harm to the system before triggering behavioral analysis and a subsequent quarantine/cleaning routine. Given the limitations of each of these methods, malware remains a constant threat for computer users and the costs associated with a failure to promptly detect and properly quarantine or otherwise respond to a malware infection may be severe. For example, a malware infection may result in the loss or corruption of irreplaceable user data if it is not detected and dealt with quickly.

Antivirus and malware detection software has become increasingly more sophisticated in order to combat malware. However, even the best antivirus software is unable to recognize all possible threats, especially new or unusual forms of malware. As such, there is a general need in the art for improved methods of preserving and protecting user data from modification or loss due to malware. Such methods may operate in conjunction with, or in some cases as an alternative to, comprehensive antimalware scanners.

SUMMARY

The present disclosure provides systems, methods and computer program products for protecting user data from modification or loss due to malware. In one example aspect, a method according to the disclosure includes monitoring a file system of a computer, the file system containing a plurality of files, for the creation of a copy of a file in the file system; upon detection of a copy of at least one file, determining whether the copy is encrypted or modified by comparing the copy to the file; upon determining that the copy is encrypted or modified, suspending a process of the computer that would overwrite the file with the copy; warning a user of the computer that an encrypted or modified copy has been detected; and receiving authorization from the user to allow or deny the overwriting of the file with the encrypted or modified copy.

In an alternative aspect, the method includes comparing the copy to the file by comparing at least one parameter selected from the following: a) a file size; b) a file extension; or c) a file signature.

In an alternative aspect, upon authorization to allow the overwriting of the file with the encrypted or modified copy, the suspended process is resumed.

In an alternative aspect, upon authorization to deny the overwriting of the file with the encrypted or modified copy, one or more of the following occurs: a) the file is restored from a previous version; b) the suspended process is killed; and/or c) the user is provided with instructions to remove malware that initiated the creation of the encrypted or modified copy.

In an alternative aspect, the file is: a) an operating system file; b) a boot loader file; c) a Windows ntldr; d) a digital wallet file; e) a file that is stored remotely; f) a file stored on a network drive; and/or g) a backup file.

In an alternative aspect, the copy is determined to be encrypted or modified when at least one of the following parameters is true: a) the file size of the copy is identical to or within approximately 1% of the file size of the file; b) the file extension of the copy is the same as the file extension of the file; and/or c) the copy and the file do not have a common file signature.

In an alternative aspect, comparing the copy to the file includes comparing a file signature of the copy against a file signature of the file, and the file signature includes at least one of the following: a) data that is specific to a given file type; b) bytes located in a header of the file or copy; or c) file type specific bytes located in a header of the file or copy.

In an alternative aspect, upon determining that the copy is encrypted or modified, one or more of the following occurs: a process of backing up the file to a local, remote or networked storage system is paused; or a process of uploading, syncing or otherwise transferring the file to a cloud-based storage system is paused.

In an alternative aspect, a method of protecting user data from modification or loss due to malware is disclosed, said method including the following steps: monitoring a file system of a computer, the file system containing a plurality of files, for the creation of a copy of a file in the file system; upon detection of a copy of at least one file, determining whether the copy is encrypted or modified by comparing the copy to the file; upon determining that the copy is encrypted or modified, suspending a process of the computer that would overwrite the file with the copy; checking a list, a second file or a database containing one or more preauthorized rules for handling the detection of an encrypted or modified copy; optionally, warning a user of the computer that an encrypted or modified copy has been detected; and based on the one or more preauthorized rules, allowing or denying the overwriting of the file with the encrypted or modified copy, or redirecting the copy to an alternative output location.

In an additional aspect of the disclosure, a system for protecting user data from modification or loss due to malware is disclosed the system including a processor configured to perform the steps of any of the methods disclosed herein.

In an additional aspect of the disclosure, a computer program product embedded in a non-transitory computer-readable storage medium is disclosed, the computer-readable storage medium comprising computer-executable instructions for protecting user data from modification or loss due to malware, the medium including instructions for performing the steps of any of the methods disclosed herein.

This simplified summary of exemplary aspects of the disclosure serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and together with the detailed description, serve to explain their principles and implementations.

DETAILED DESCRIPTION OF SELECTED EMBODIMENTS

Exemplary aspects of the disclosure are described herein in the context of a system, method and computer program product for preserving and protecting user data from modification or loss due to malware. Those of ordinary skill in the art will realize that the following description is illustrative only and is not intended to be in any way limiting. Other aspects will readily suggest themselves to those skilled in the art having the benefit of this disclosure. Reference will now be made in detail to examplay aspects as illustrated in the accompanying, drawings. The same reference indicators will be used to the extent possible throughout the drawings and the following description to refer to the same or like items.

As described herein, methods and systems are disclosed for protecting user data from modification or loss due to malware. As will be appreciated herein, the methods and systems provide an efficient mechanism for preserving user data that may otherwise be corrupted, deleted or otherwise lost due to a malware infection of the user's computer system.

As noted above, malware can take many forms. The term malware, broadly defined, includes but is not limited to any software used to disrupt computer operations, gather sensitive information, gain access to private computer systems, or display unwanted advertising. Common types of malware include viruses, worms, Trojan horse programs, rootkits, and spyware. Malware may be destructive (e.g., it may crash a user's computer system or device, modify or delete files, corrupt data, format hard disks or memory resulting in the loss of all contents, and /or spread malware across a network. Malware may also spy on a user, surreptitiously recording and/or transmitting private user data such as credentials and trade secrets (e.g., spyware, keystroke recorders). Malware may also be used to perpetrate theft or ransom related to a user's data and electronic assets (e.g., a digital wallet). Sophisticated malware may possess traits associated with each or all of these functional categories. Out of all of these subtypes, malware used to ransom user data and electronic assets (so called "ransomware") present perhaps the most serious concern, as such programs are difficult to detect and may cause irreversible data loss prior to detection.

Ransomware comprises a class of malware that restricts access to the computer system that it has infected, often by encrypting files or entire drives on the computer system and presenting the user with a message requiring payment of a ransom in order to receive the decryption key. Ransomware exists in many forms, and can include variants that target a particular subset of the files on a computer system, such as operating system files, or specific file types such as digital wallets. Similarly, ransomware has been observed that target particular storage devices (e.g., a primary internal hard drive, external drives, network-attached storage, flash memory, etc.). Ransomware typically propagates like a conventional computer worm, entering a system through a downloaded file or a vulnerable network service. Following the initial download (or a delayed activation) the ransomware will then typically execute a payload, such as a routine that will begin to encrypt personal files on the victim's hard drive. Some types of ransomware operate by simply locking a user's computer system, e.g., by presenting a persistent popup message that cannot be easily blocked by a novice computer user. In either case, the ransomware will then normally attempt to extort money from the system's user by presenting a message demanding that they purchase either a tool to decrypt the encrypted files, or an unlock code to otherwise restore functionality to the system. Ransomware designed to simply lock a user's computer is often troublesome, but not a serious concern. However, encryption-based ransomware presents a serious threat, as the computational requirements associated with cracking strong encryption may render the files irretrievably lost unless the user agrees to pay the required ransom.

In recent years, widespread usage of Bitcoin and other anonymous payment systems has led to an increase in the popularity of ransomware, as digital wallets represent a high value target for ransomware-based theft. For example, ransomware has been observed that encrypts a user's digital wallet, with decryption offered upon payment of a ransom. Moreover, sophisticated forms of ransomware have been observed that propagate from a local infection to networked drives, resulting in the potential loss of redundant backups saved on a network drive.

Current antivirus and malware scanners are often unable to adequately protect users from ransomware. Signature and heuristic based methods may fail to detect novel forms of ransomware until data has already been locked or encrypted. Similarly, behavioral methods may fail to be triggered in time to prevent loss of data, particularly in cases where ransomware employs rootkit technology to circumvent protective measures or otherwise bypass the triggering mechanism. Since it is quite difficult to reliably prevent a system from infection, the only reasonable way for users to avoid data (or monetary) loss due to ransomware is to backup data on a regular basis. However, regular backups require excess storage, which adds unnecessary costs for both individual and enterprise-level users. Perhaps more importantly, by simply backing up data a user is merely generating redundancy rather than taking proactive steps to detect and prevent data loss from occurring in the first place.

In contrast, the inventors responsible for the present disclosure have surprisingly found that file and disk versioning technologies (normally used for simply backing up data) may be leveraged to proactively preserve or protect user data from modification or loss due to malware. Methods and systems based on this new technology are particularly useful for combating ransomware, as they may be implemented in a manner that provides efficient detection and identification of attempts to encrypt user data. Given the widespread use of strong encryption techniques by current ransomware, methods and systems that provide proactive data protection are particularly useful. Moreover, these newly disclosed methods represent a significant advancement compared to known methods for data preservation that rely on the creation of redundant backups in that they reduce the need for excess storage to accommodate redundant copies of user files and disks.

Figure 1:
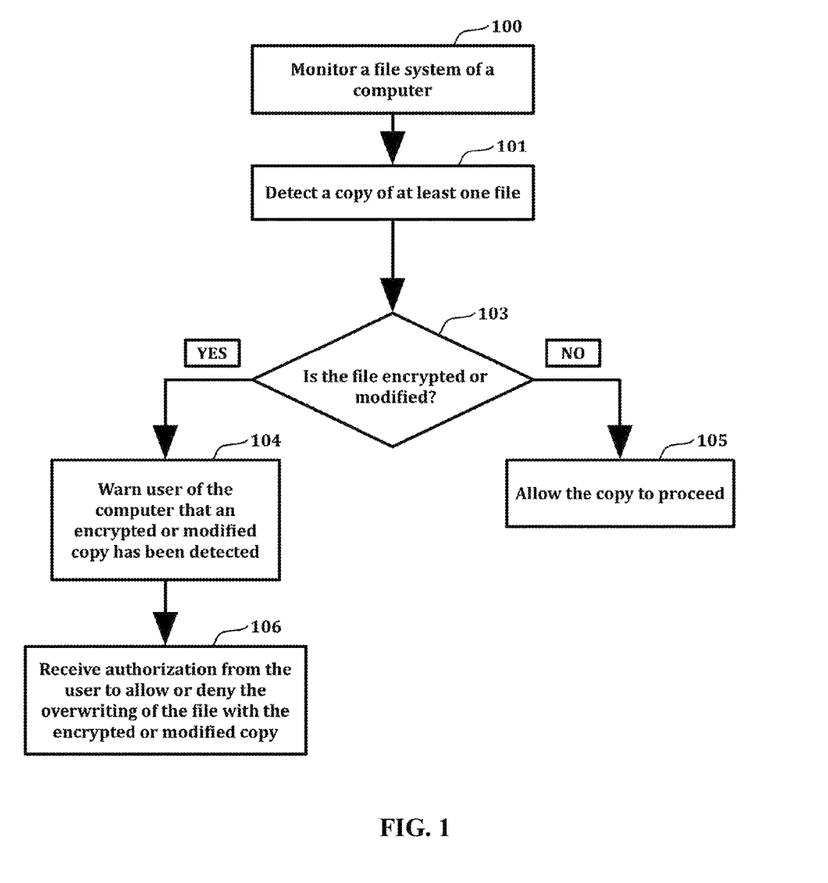
FIG. 1 illustrates a block diagram of a system or method for protecting user data from modification or loss due to malware according to an exemplary aspect.

FIG. 1 is a schematic block diagram that illustrates an exemplary method according to the present disclosure. As shown by this method, a software application can be executed on a computer system that monitors a file system of the computer, the file system comprising a plurality of files, for the creation of a copy of a file in the file system. Upon detection of a copy of at least one file (e.g., by monitoring for processes associated with file copy operations), the software application may proceed to determine whether the copy is encrypted or modified by comparing the copy to the file. In some aspects, the copied file may be an operating system file (e.g., the Windows boot loader "ntldr"), a digital wallet (e.g., a wallet file containing bitcoins), or a remote file (e.g., network attached storage, an external drive, etc.). It is understood that the present methods may be broadly applied to any file types, portions of a local or remote disk, entire file systems, etc., in a non-limiting fashion.

Various methods known in the art may be employed to determine whether the copy is encrypted or modified. However, in some exemplary aspects, the comparison may be performed by comparing one or more the file size, file extension or file signature of the file and the copy. The term "file signature" is understood to mean a file type specific identifier. Most file formats (".docx", ".bmp", ".jpg", etc.) have a file signature that allows applications or the computer's operating system to determine the file type by examining the data or formatting contained in a given file. In some aspects, a file signature may be the initial few bytes of a file header that are specific to a given file type. A file signature may also be more complex, e.g., depending on the formatting or arrangement of data in a file rather than the content.

Comparison of the file signature of the file and the copy is particularly useful for determining whether a given copy is an encrypted or modified version of a file (e.g., a copy encrypted by malware or ransomware). An encrypted copy of a file may have highly similar or identical properties compared to the source file, such as an identical file name and a similar if not identical file size. These highly similar or identical properties may cause a user to fail to notice that a copied file has been encrypted until there is an attempt to open, view or execute the contents. However, by examining the file signature of the copy, software applications performing the disclosed methods may efficiently detect that a copy has been encrypted or otherwise modified in a way that renders the data potentially inaccessible to the user.

In some exemplary aspects, the present methods may be paired with a backup system or software application. The backup system, in some aspects, may mirror the contents of the computer system or external storage which are monitored by a software application applying the disclosed methods. The backup system, in preferred aspects, utilizes a versioning system to maintain multiple backup copies of files on the monitored computer system or external storage, which reflect snapshots of the files contained in the computer system or external storage at various time-points. Saving multiple versions of a file, drive or entire file system allows a user to restore a corrupted, encrypted or otherwise inaccessible file to a previous version that may contain the desired contents in a readable or executable format.

Upon determining that the copy is encrypted or modified (e.g., by comparing the file signature of the file and copy or other parameters described herein), the software application may then suspend one or more processes currently running on the computer system that are associated with or otherwise required for the copying operation. Suspension of the process (or processes) effecting the copying may allow the software application to prevent the copy from overwriting the original file. Ransomware, as described above, will typically attempt to encrypt files on a computer system by replacing individual files with encrypted versions inaccessible to the user of the computer system. Thus, it is preferable to stop the overwriting operation before completion when a suspicious encrypted or modified copy is detected, so as to avoid the potential loss of the original user-accessible version of the file.

After or concurrently with the suspension of one or more processes associated with the copying operation, the software application may then warn the user that an encrypted or modified file has been detected. The warning may take the form of a prompt, popup, alert sound or visual indicator, or any other means of providing notice to a local or remote user of the computer system. Finally, after warning the user, the software application may then receive instructions or input from the user authorizing the software application to allow or deny the copying operation. In some aspects, authorization may be provided indirectly (e.g., a user may save preferences or specific instructions as to how particular copying operations should be handled). A user may, for example, establish and set out rules that pre-authorize or deny copying operations under specific conditions.

In some aspects, preauthorized retention rules may be established for the software application that automatically protect specific disks, files, file types (e.g., operating system files, specific file extensions), types of drives (e.g., local, external), or files with specific properties (e.g., files with a creation or modification date within a given range or past a particular threshold). Rules may also restrict copying operations on a computer system or particular drives in order to setup an "append only" policy, preventing overwriting of files contained on the computer system or drive. In some aspects, retention rules may be applied from a secure server-side environment. Rules may also be established that require specific modes of authorization, or multi-factor authentication, in order to change the current retention policy, authorize copying, overwriting, or any other operation that may result in loss or damage to data. For example, a rule may be established that requires authentication via an SMS message sent from a trusted phone number or some other means of communication in order to verify a user's identity. The software application may be configured to provide a user of the computer system with feedback regarding a current or proposed retention policy (e.g., warning a user about conflicting or inadvisable rules). In selected aspects, a rule may be established that redirects the target location of the copying operation instead of denying the operation (e.g., if an encrypted file is detected, a copy may be saved to a different folder or drive on a backup system instead of overwriting a previously archived version on the backup system).

In selected aspects, the use of preauthorized retention rules allows for methods according to any of the disclosed aspects to be performed without the need for immediate user intervention. In these aspects, there may be no need to warn a user or to receive authorization as to whether a copy should be allowed. Thus, in selected aspects of the disclosure a "warning" or "receiving authorization" step, as recited by several aspects of the disclosure, may be optional or entirely omitted. In some exemplary aspects, the software performing the disclosed methods may, upon determining that a copy is encrypted or modified, check a file, a list and/or a database containing preauthorized rules in order to determine whether to allow or deny the copying operation.

Exemplary aspects of the present methods may be designed to include retention policies and/or authentication as discussed above in order to provide heightened protection against malware and ransomware. For example, application of an "append only" policy, as described above, may be used to prevent ransomware from encrypting critical backup data stored on an external drive. Backup systems based on file versioning alone, which do not implement the present methods, are susceptible to ransomware attacks, as a backup drive containing the archives may be encrypted by ransomware. In contrast, storage solutions that utilize the present methods may be designed to prevent archived data from being overwritten (e.g., by detection and suspension of the copying operation and/or by implementation of the retention policies described herein).

In some exemplary aspects, the present methods may be performed as part of, or in conjunction with, a backup storage system such that the methods are configured to prevent the backup storage system from archiving encrypted files. As discussed elsewhere in the disclosure, backup storage systems may be designed to store a backup copy of one or more files on a computer system (e.g., by simply duplicating a file at a given time-point or by implementing a versioning system to store multiple versions of a given file). It is undesirable for a backup system to store encrypted, corrupted or otherwise user inaccessible copies of a file produced by ransomware (or other malware). Storage of such files wastes storage space and in some cases, may result in the loss of data. For example, a backup system with a limited storage space may follow a policy that calls for backup copies to be overwritten when a new or modified version is archived in order to conserve space. If the more recent version is actually an encrypted file generated by malware, an unmodified earlier version would then be overwritten when the encrypted copy is archived, resulting in the loss of a usable archived version. In order to avoid this scenario, methods according to the disclosure may be utilized to check files that are selected for archiving by detecting an attempt to create a copy of a computer system file on a storage system (e.g., an external or network drive) Upon detection of an encrypted copy, the backup operation would be paused, such as by implementing the suspension and warning steps of any aspect of the disclosure. In selected embodiments, the storage system is a cloud-based storage system, a backup system that employs a file versioning feature, and/or a remote storage system. In any configuration according to this exemplary aspect, the comparison step (e.g., comparing the copy to the file on the computer system to determine whether the copy is encrypted) may be performed prior to uploading, transferring or otherwise transferring the copy to the storage system, (e.g., prior to syncing the file with a cloud-based storage system). In any configuration according to this exemplary aspect, preauthorized rules for addressing the detection of an encrypted file may be implemented as described above.

Figure 2:
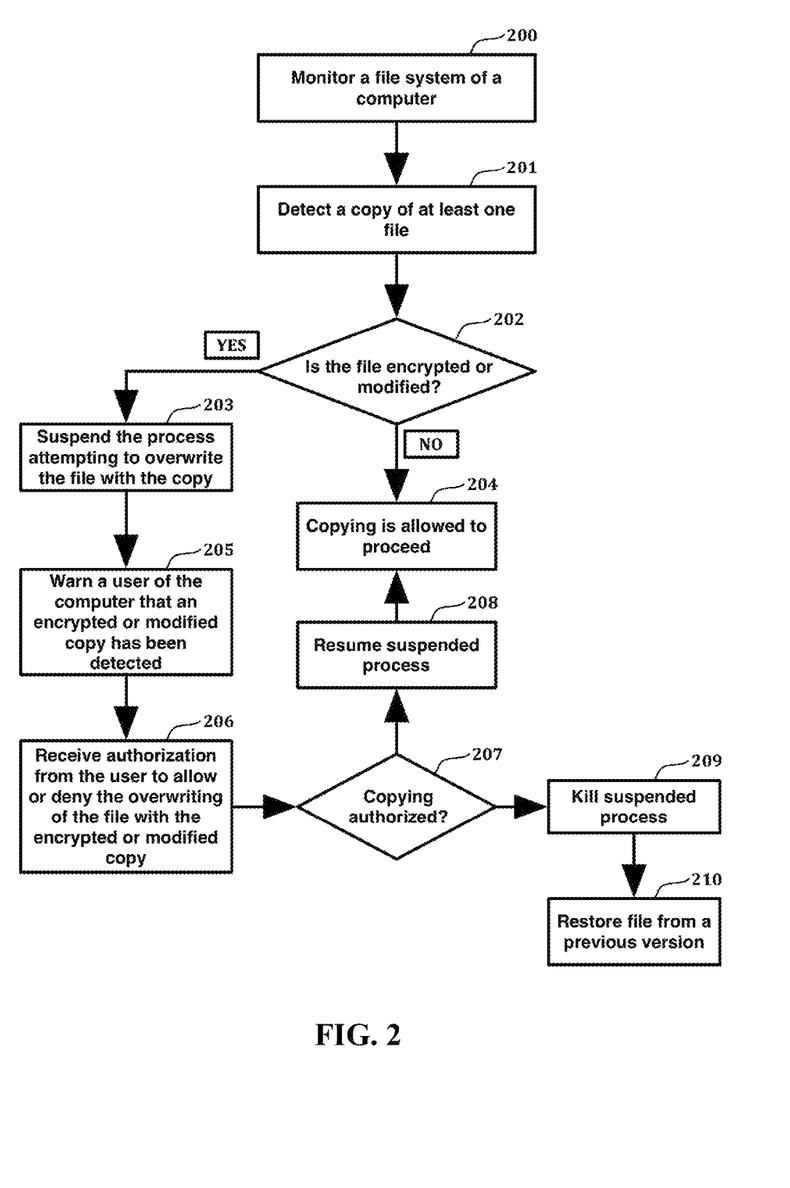
FIG. 2 illustrates a block diagram of a system or method for protecting user data from modification or loss due to malware according to a further exemplary aspect.

FIG. 2 is a schematic block diagram that illustrates another exemplary aspect according to the present disclosure. As illustrated by this method, the general method of FIG. 1 may be modified to perform additional actions after receiving authorization from the user. Upon authorization to allow a copying operation, the suspended processes associated with the copying may be resumed and allowed to proceed. Alternatively, if a user authorizes denial of the copying, the software application may instead be configured to kill the suspended processes, verify that the original file remains accessible or unmodified, and/or initiate restoration of the original file (if it has been overwritten or rendered inaccessible). Restoration may comprise querying an internal database or separate backup software application to determine whether a previous version of the overwritten or inaccessible file is available (e.g., by querying a versioning system) and then replacing the overwritten or inaccessible file with the archived version. The user may optionally be provided with a message informing them of this activity or the end result.

Figure 3:
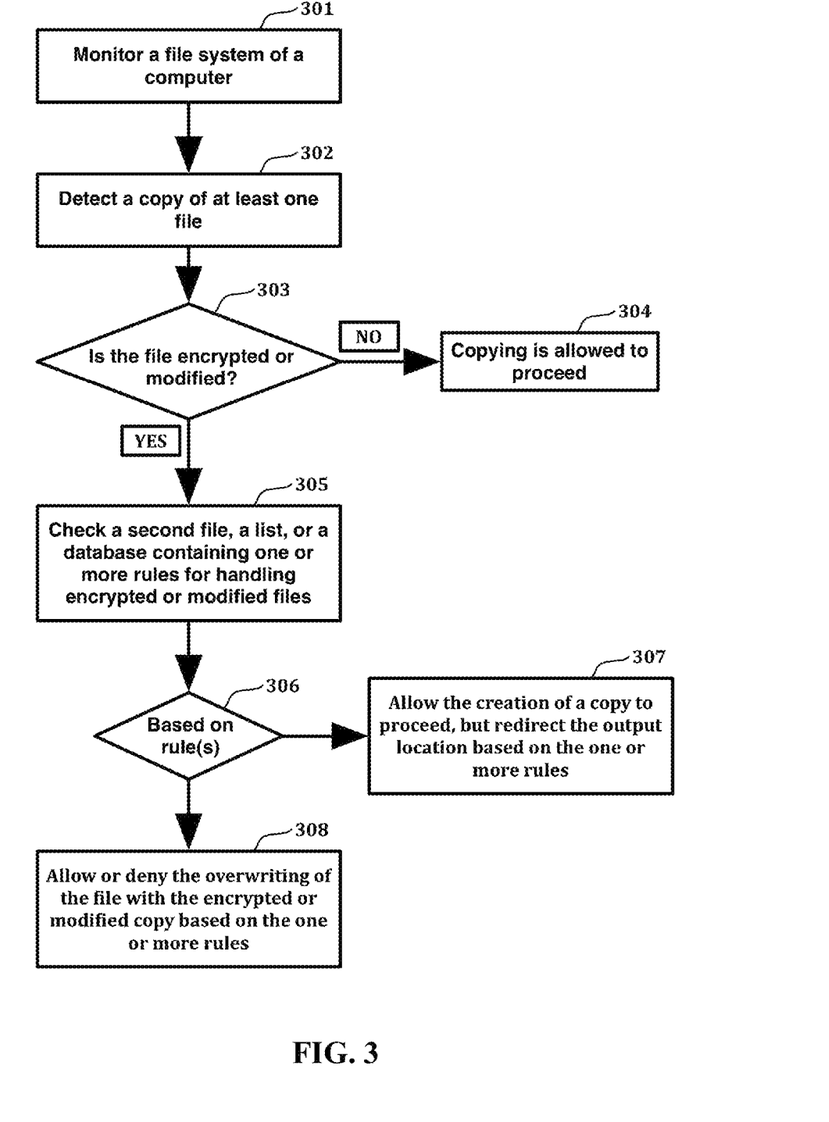
FIG. 3 illustrates a block diagram of a system or method for protecting user data from modification or loss due to malware according to a further exemplary aspect.

FIG. 3 is a schematic block diagram that illustrates another exemplary method according to the present disclosure. As shown by this method, the general method of FIG. 1 may be modified to include a step of checking a second file, a list, or a database containing one or more preauthorized rules for handling encrypted or modified files instead of (or optionally in addition to) warning a user and receiving user authorization. Based on these rules, the copying operation may be allowed to proceed or be denied. In some aspects, if an encrypted or modified file is detected the copying operation may still be allowed to proceed subject to the output being redirected (e.g., to a different backup system folder or drive so that a previously archived copy is not overwritten).

Figure 4:
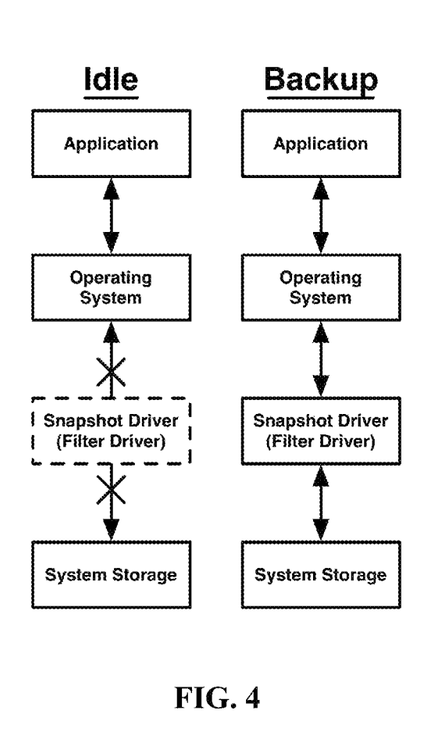
FIG. 4 illustrates a block diagram of a system or method for protecting user data from modification or loss due to malware according to a further exemplary aspect.

FIG. 4 is a schematic block diagram that illustrates an alternative exemplary method according to the present disclosure. As shown by this method, a driver may be implemented on a computer system that intercepts write requests, backs up original files or sectors and saves the modified content (what may be alternatively referred to as a "snapshot" or "filter" driver). FIG. 4 illustrates that the snapshot driver may be configured to perform these intercept, backup and/or saving functions during a "backup" mode. When not in use, (e.g., "idle" mode) this functionality may be partially or totally disabled.

Figure 5:
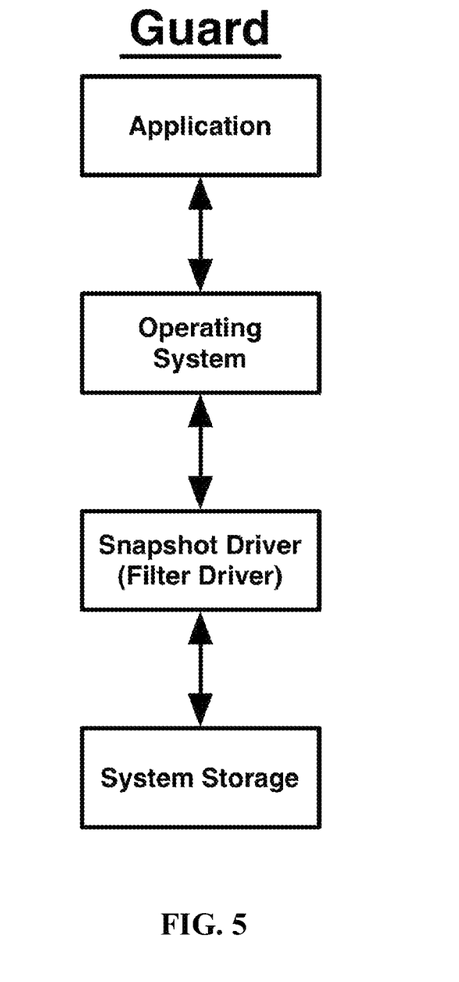
FIG. 5 illustrates a block diagram of a system or method for protecting user data from modification or loss due to malware according to a further exemplary aspect.

FIG. 5 is a schematic block diagram that illustrates an alternative exemplary method according to the present disclosure. As shown by this method, the general aspect of a snapshot driver described, e.g., in FIG. 4 may be implemented in a more comprehensive manner. In this exemplary aspect, the snapshot driver may be configured to intercepts write requests, determine whether a write request is abnormal (unauthorized, suspicious, flagged by a predetermined rule, etc.), and then allow or deny the writing operation to proceed to back up or save an original file to a predefined backup location.

The detection of an abnormal file may be based on any of the aspects or parameters disclosed herein or otherwise known in the art. For example, the snapshot may identify a write request as abnormal where the file signature does not match (e.g., a DOCX/PPTX file is being written, but first two bytes are not 50h 4Bh). Various rule may be preconfigured by a user or otherwise provided in the software (e.g., as a default set of rules or a custom ruleset file). Additional parameters that may be used to determine whether a write operation is abnormal include, but are not limited to, the file size of the file being written, whether the file to written is determined to be encrypted, whether the file to be written is accessible, and the various other parameters described above in the relation to alternative aspects. Similarly, the process may be governed by any aspect of the rulesets and rule implementations disclosed herein.

In methods and systems according to this aspect, the snapshot driver may be configured to operate in one or more modes. Each mode may apply a unique set of rules (e.g., controlling the mechanism for determining whether a write operation is abnormal and/or policies for handling abnormal files or predetermined scenarios). In one aspect, the method or system implements at least one of a "BLOCK" mode, a "SOFT" mode or an "OFF" mode which control the response that is triggered when abnormal write request is detected. In this exemplary aspect, when BLOCK mode is enabled, the abnormal writing request is blocked, and an OS-level process (agent) is signaled to display a pop-up containing a warning. The driver and/or agent may also, optionally, kill the process that initiated the writing request. This is safest, but most aggressive mode, which may lead to user inconvenience. As an alternative, the method or system may be configured in the SOFT mode, which allows the write request to proceed by saving the modified content, but in a manner that retains a copy on backup storage (e.g., preventing overwriting of a backup copy). Optionally, the user may be presented with a warning message regarding the abnormal writing request. This mode is more convenient than BLOCK mode, but may allow ransomware or malware to infect or persist on a computer system. Alternatively, the method or system may be configured in OFF mode wherein the abnormal writing request is allowed to proceed without intervention. Each of these three modes may be implemented together as a set, or partially as a single or dual-mode implementation. In selected aspects, software implemented the disclosed methods may be configured with policies that apply different modes based upon preset policies (e.g., enforcing a more aggressive BLOCK mode when a given user is identified, during particular time periods, when particular software is detected on a computer system). These modes may further be incorporated into any of the alternative aspects disclosed herein to provide a more comprehensive security/syncing platform.

Figure 6:
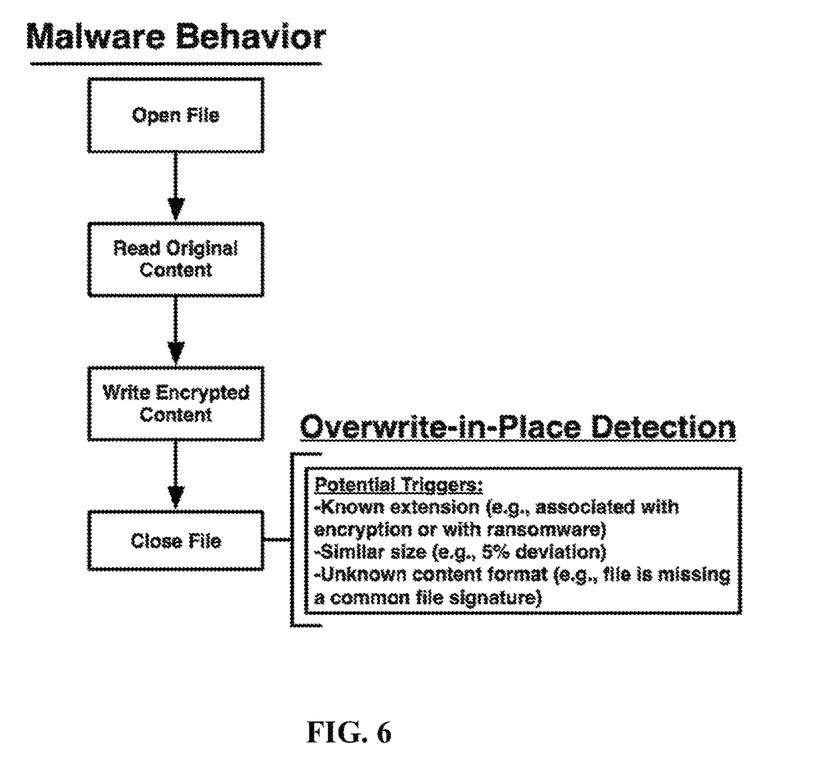
FIG. 6 illustrates a block diagram of a system or method for protecting user data from modification or loss due to malware according to a further exemplary aspect.

FIG. 6 is a schematic block diagram that illustrates another exemplary system according to the present disclosure. As illustrated by this figure, the presently disclosed methods may be used to detect ransomware or malware that overwrites the contents of a source file with encrypted contents (e.g., "overwrite-in-place" ransomware/malware). In this example, suspected overwrite-in-place ransomware/malware is detected upon the closure of a source file subject to monitoring. Detection can be based on one or more rules, such as whether the file being closed has a file extension associated with encryption or ransomware or whether the file being closed has an unknown content format (e.g., an unrecognized file signature). In some exemplary aspects, detection may be based on the file size of the file being close. As discussed above, some ransomware implementations that have been identified overwrite source files with encrypted versions having approximately the same file size. This reduces the likelihood of automatic detection of suspicious activity because the overwritten file has similar file size attributes to the original. However, file size may be used to detect the presence of ransomware/malware when carrying out the present methods. In some exemplary aspects, a file size change of up to 5% may be used to detect the suspected presence of ransomware/malware. In some exemplary aspects, a pre-set cut-off value for file size changes may be used (e.g., 1, 2, 3, 4, 5, 6, 7, 8, 9, or 10%), or any other arbitrary value suitable for detection. In some exemplary aspects, multiple rules may be used to detect suspected ransomware/malware, such as a set of rules based on content format and file size.

The following example illustrates an implementation based on the exemplary aspect described above. A malware may infect a system that has a monitoring system according to the present disclosure installed on it and start the process of data encryption. During the encryption process, the malware may open one or more file(s) for read/write operations, read the contents of the file(s), encrypts some or all of this content, write the encrypted content to the previously opened file(s), and then closes the file(s). The monitoring system may be configured such that the "open for write" action always triggers the monitoring system's prevention mechanism(s), e.g., which may create a copy of the file (e.g. snapshots saved using file-sync-and-share or backup methods). The monitoring system may further be configured such that the "close" action will trigger further analyses and/or countermeasures, which may include checking file content for known signatures (e.g. "PK" codes at the start). If file name is known, but signatures are not, the monitoring system may take action, for example by warning users, suspending or stopping the process that closed the file. Additional response options include: warning the user (with an option of suspending further warning for period of time); suspending or stopping the process (based on settings or user selection); and/or restoring the original content of the file. It is understood that a monitoring system according to the present disclosure may implement any or all of these features.

Figure 7:
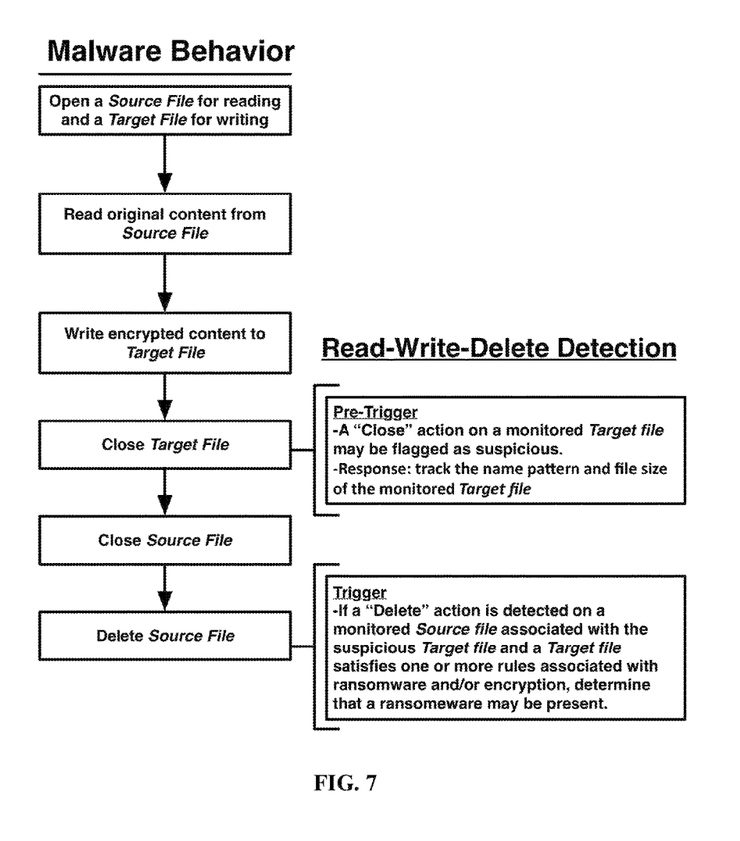
FIG. 7 illustrates a block diagram of a system or method for protecting user data from modification or loss due to malware according to a further exemplary aspect.
Figure 8:
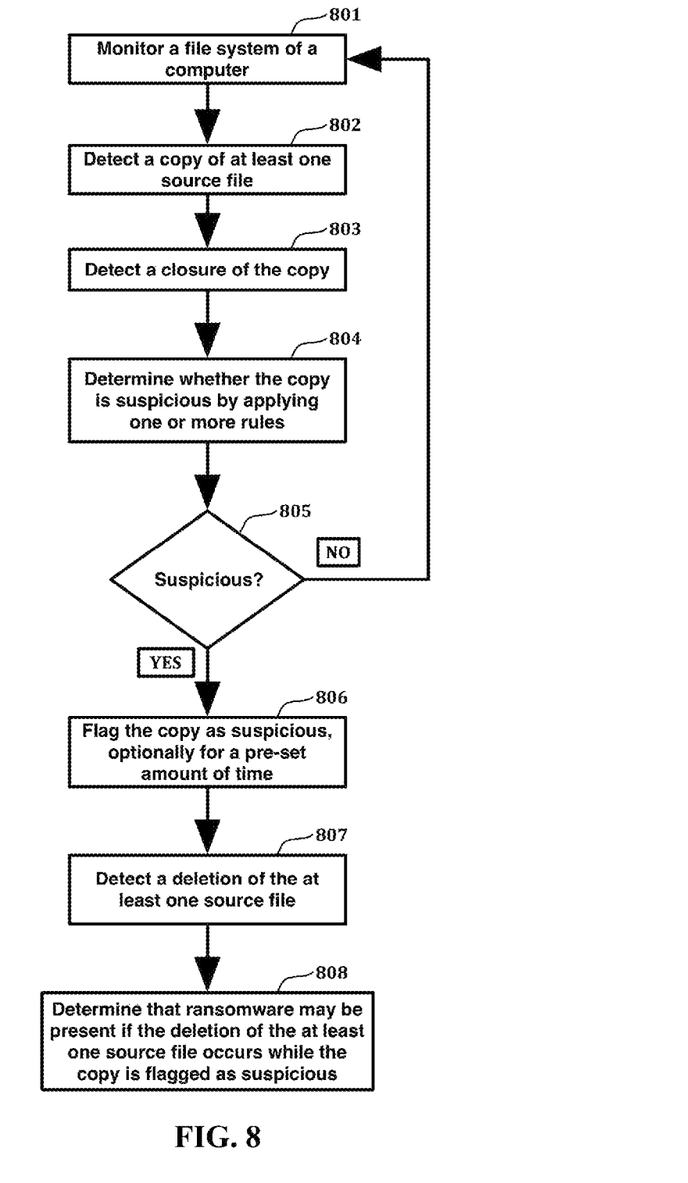
FIG. 8 illustrates a block diagram of a system or method for protecting user data from modification or loss due to malware according to a further exemplary aspect.

FIG. 7 is a schematic block diagram that illustrates another exemplary method according to the present disclosure. As illustrated by this figure, the presently disclosed methods may be used to detect ransomware or malware that reads the contents of a source file, writes an encrypted version to a target file, and then deletes the source files (e.g., "read-write-delete" ransomware/malware). In this example, a "close" action on a file of a monitored file system operates as a pre-trigger used to flag suspicious activity. Upon closure, the file is analyzed to determine whether it satisfies one or more rules associated with the detection of ransomware or encryption generally (e.g., whether the closed file has a file extension known to be associated with encryption, lacks a common file signature, or is unreadable). If the closed file is found to be suspicious based upon the applied rule (or set of rules), it can be labelled or otherwise flagged as suspicious. This flag may be assigned permanently (e.g., until removed by the monitoring program or by a user) or set to expire after a given duration of time or after a particular event has occurred. In some exemplary aspects, the flag may be set to expire after 15 minutes, or any other arbitrary timeout period. During the time period while a file is labelled suspicious, the monitoring software or system may be configured to determine and/or track one or more attributes or parameters of the closed file (e.g., the name pattern and file size of the file). In some exemplary aspects, the closed file may be monitored to determine changes to the file size, file signature, contents, permissions or any other attribute/parameter changes after the closure). In some exemplary aspects, the pre-trigger is applied when a "close" action is performed on a file after a previous "copy" action is detected involving the same file. In either case, the method may involve a step of identifying a source file used as a source of content copied to the closed file, whether before or after the "close" action is performed. Suspected ransomware/malware may be detected if a source file known to be associated with the closed file is deleted while the closed file is flagged as suspicious. In some exemplary aspects, detection of suspected ransomware/malware may require satisfaction of one or more additional rules. For example, the naming pattern and/or file size of the suspicious closed file may also be required to satisfy one or more rules in order to increase stringency. In some exemplary aspects, the monitoring system may be configured to apply and track multiple types or levels of suspicion. FIG. 8 is a schematic block diagram that illustrates another exemplary method according to the present disclosure, similar to the exemplary aspect shown in FIG. 7 but with additional details illustrated.

The following example illustrates an implementation based on the exemplary aspects described above. A malware may infect a system that has a monitoring system according to the present disclosure installed on it and start the process of data encryption. During the encryption, the software may open a source file for reading and a target file for writing, read the contents of the source file, encrypt the contents in memory or in the stream, and write the encrypted contents to the target. Thereafter, the malware may close the source file and the target file, and then delete the source file. The monitoring system may be configured such that the closing of the target file will cause system to check for known "read-write-delete" behavior, such as: (1) known extension patterns (e.g. ransomware uses the format [name].doc.encrypted); known extension and missing signature (as discussed in the previous example above); or other behavioral patterns. At this stage, the system may raise a "suspicion" flag, marking the closed file size and naming pattern but will not take any action yet, because no data is lost.

As illustrated by FIG. 7, the deletion of source file may trigger reaction by the monitoring system. If the system has a suspicion flag associated with the source file, and the known source file is deleted—matching the naming pattern and/or size, the system will take action, such as by: warning the user (with an option of suspending further warning for period of time); and/or suspending or stopping the process (based on settings or user selection)

In addition to these examples, it is understood that any of the systems and methods disclosed herein may be configured to operate in an interactive mode, such that when the monitoring system detects ransomware-like behavior, a user may be shown a prompt on the desktop or via another form of a graphical user interface, which asks the user to choose a response (e.g., "kill the process," "pause the process," "do nothing," etc.). The system may also include an option allowing the user to specify that the selected response should be carried out when similar events are detected over a given time period (e.g., 15 minutes). The systems may also be configured to operate in an automatic aggressive mode, such that when a ransomware-like behavior is detected, the monitoring system automatically: kills the suspicious process; prevents overwriting or deletion; and/or sends notification to administrator via event logs, e-mail or any other means of notification. Alternatively, or in addition, the monitoring system may be configured to operate in an automatic safe mode, wherein upon detection of ransomware-like behavior, the monitoring system: does not kill the suspicious process; allows overwriting or deletion continue; saves the copy of original file(s) into an alternative location (e.g., a backup repository); and/or sends notification to administrator via event logs, e-mail or any other means of notification.

Figure 9:
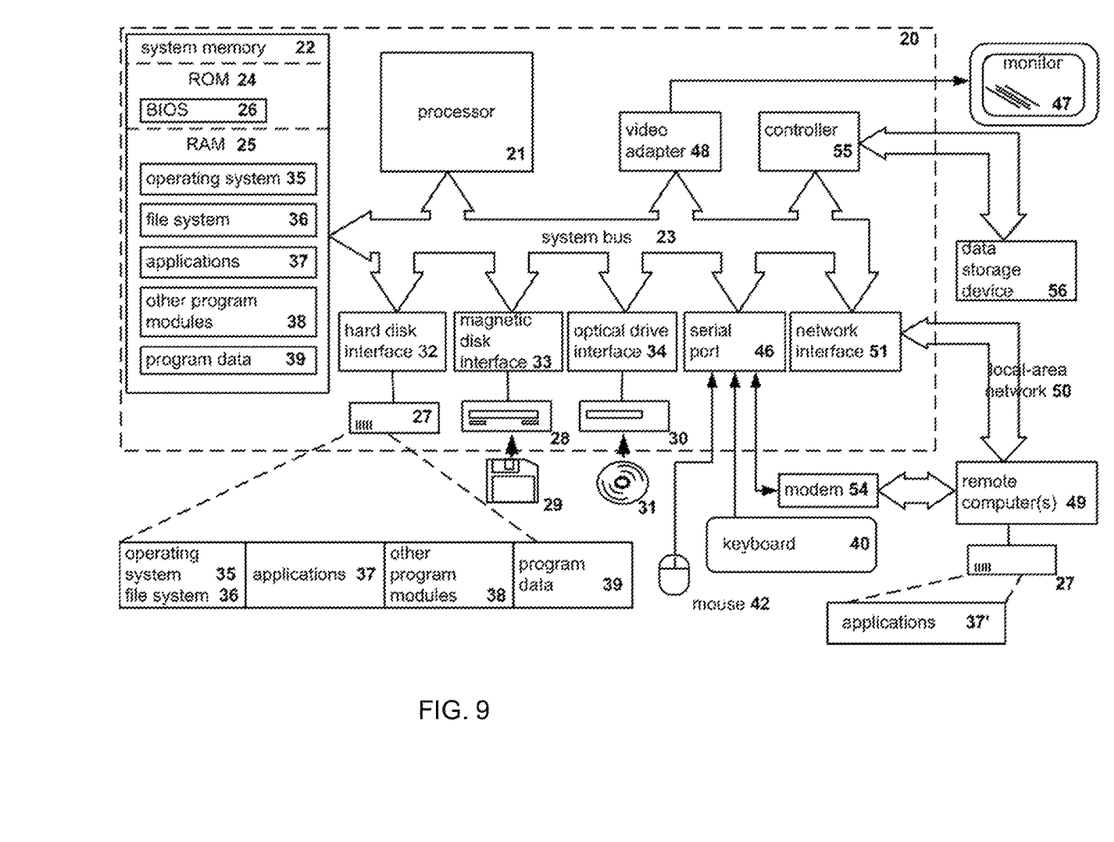
FIG. 9 illustrates an example of a general-purpose computer system on which the disclosed systems and method can be implemented.

FIG. 9 illustrates an example of a general-purpose computer system (which may be a personal computer or a server) on which the disclosed systems and method can be implemented according to an example aspect. It should be appreciated that the detailed general-purpose computer system can correspond to the computer system described above with respect to FIG. 1.

As shown in FIG. 9, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 9. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of protecting user data from modification or loss due to malware, the method comprising:
    monitoring a file system of a computer, which comprises a plurality of files, for the creation of a copy of a file in the file system, upon detecting an open for write action;
    upon detection of the copy of the file, determining whether the copy is encrypted or modified by comparing the copy to the file;
    upon determining that the copy is encrypted or modified, suspending a currently ongoing process used in the creation of the encrypted or modified copy of the file prior to overwriting the file with the copy, thereby reducing a need to create redundant backups for excess storage to accommodate redundant copies of user files and disks;
    warning a user of the computer that an encrypted or modified copy has been detected; and
    receiving authorization from the user to allow or deny the overwriting of the file with the encrypted or modified copy, wherein the suspended process can be resumed upon receiving the user authorization to allow the overwriting of the file.

2. The method of claim 1, wherein comparing the copy to the file comprises comparing at least one parameter selected from the following:
    a) a file size;
    b) a file extension; and/or
    c) a file signature.

3. The method of claim 1, wherein the suspended process is resumed upon authorization to allow the overwriting of the file with the encrypted or modified copy resumed.

4. The method of claim 1, wherein upon authorization to deny the overwriting of the file with the encrypted or modified copy, one or more of the following occurs:
    a) the file is restored from a previous version;
    b) the suspended process is killed; and/or c) the user is provided with instructions to remove malware that initiated the creation of the encrypted or modified copy.

5. The method of claim 1, wherein the file comprises:
 a) an operating system file;
 b) a boot loader file;
 c) a Windows ntldr;
 d) a digital wallet file;
 e) a file that is stored remotely;
 f) a file stored on a network drive; and/or
 g) a backup file.

6. The method of claim 1, wherein the copy is determined to be encrypted or modified when at least one of the following parameters is true:
 a) the file size of the copy is identical to or within approximately 1% of the file size of the file;
 b) the file extension of the copy is the same as the file extension of the file; and/or
 c) the copy and the file do not have a common file signature.

7. The method of claim 1, wherein comparing the copy to the file comprises comparing a file signature of the copy against a file signature of the file, and the file signature comprises at least one of the following:
 a) data that is specific to a given file type;
 b) bytes located in a header of the file or copy; and/or
 c) file type specific bytes located in a header of the file or copy.

8. The method of claim 1, wherein upon determining that the copy is encrypted or modified, one or more of the following occurs:
 a process of backing up the file to a local, remote or networked storage system is paused; or
 a process of uploading, syncing or otherwise transferring the file to a cloud-based storage system is paused.

9. A system for protecting user data from modification or loss due to malware, the system comprising a hardware processor configured to:
 monitor a file system by the hardware processor of a computer, the file system comprising a plurality of files, for the creation of a copy of a file in the file system, upon detecting an open for write action;
 upon detection of a copy of a file, determine whether the copy is encrypted or modified by comparing the copy to the file;
 upon determining that the copy is encrypted or modified, suspend a currently ongoing process used in the creation of the copy of the file prior to overwriting the file with the copy, thereby reducing the need to create redundant backups for excess storage to accommodate redundant copies of user files and disks;
 warn a user of the computer that an encrypted or modified copy has been detected; and
 receive authorization from the user to allow or deny the overwriting of the file with the encrypted or modified copy, wherein the suspended process can be resumed upon receiving the user authorization to allow the overwriting of the file.

10. The system of claim 9, wherein the processor is configured to compare the copy to the file by comparing at least one parameter selected from the following:
 a) a file size;
 b) a file extension; and/or
 c) a file signature.

11. The system of claim 9, wherein the suspended process is resumed upon authorization to allow the overwriting of the file with the encrypted or modified copy.

12. The system of claim 9, wherein upon authorization to deny the overwriting of the file with the encrypted or modified copy, one or more of the following occurs:
 a) the file is restored from a previous version;
 b) the suspended process is killed; and/or
 c) the user is provided with instructions to remove malware that initiated the creation of the encrypted or modified copy.

13. The system of claim 9, wherein the file comprises:
 a) an operating system file;
 b) a boot loader file;
 c) a Windows ntldr;
 d) a digital wallet file;
 e) a file that is stored remotely;
 f) a file stored on a network drive; and/or
 g) a backup file.

14. The system of claim 9, wherein the copy is determined to be encrypted or modified when at least one of the following parameters is true:
 a) the file size of the copy is identical to or within approximately 1% of the file size of the file;
 b) the file extension of the copy is the same as the file extension of the file; and/or
 c) the copy and the file do not have a common file signature.

15. The system of claim 9, wherein the processor is configured to compare the copy to the file by comparing a file signature of the copy against a file signature of the file, and the file signature comprises at least one of the following:
 a) data that is specific to a given file type;
 b) bytes located in a header of the file or copy; and/or
 c) file type specific bytes located in a header of the file or copy.

16. The system of claim 9, wherein upon determining that the copy is encrypted or modified, one or more of the following occurs:
 a process of backing up the file to a local, remote or networked storage system is paused; or
 a process of uploading or otherwise syncing the file to a cloud-based storage system is paused.

17. A computer program product embedded in a non-transitory computer-readable storage medium, the computer-readable storage medium comprising computer-executable instructions, when executed, to perform functions for protecting user data from modification or loss due to malware, the medium comprising instructions for:
 monitoring a file system of a computer, the file system comprising a plurality of files, for the creation of a copy of a file in the file system, upon detecting an open for write action;
 upon detection of a copy of a file, determining whether the copy is encrypted or modified by comparing the copy to the file;
 upon determining that the copy is encrypted or modified, suspending a currently ongoing process of used in the creation of the copy of the file prior to overwriting the file with the copy, thereby reducing the need to create redundant backups for excess storage to accommodate redundant copies of user files and disks;
 warning a user of the computer that an encrypted or modified copy has been detected; and receiving authorization from the user to allow or deny the overwriting of the file with the encrypted or modified copy, wherein the suspended process can be resumed upon receiving the user authorization to allow the overwriting of the file.

18. The computer program product of claim 17, wherein the instructions for comparing the copy to the file comprise comparing at least one parameter selected from the following:
   a) a file size;
   b) a file extension; and/or
   c) a file signature.

19. The computer program product of claim 17, wherein the suspended process is resumed upon authorization to allow the overwriting of the file with the encrypted or modified copy.

20. The computer program product of claim 17, wherein upon authorization to deny the overwriting of the file with the encrypted or modified copy, one or more of the following occurs:
   a) the file is restored from a previous version;
   b) the suspended process is killed; and/or
   c) the user is provided with instructions to remove malware that initiated the creation of the encrypted or modified copy.

* * * * *